United States Patent [19]

Umemoto et al.

[11] Patent Number: 5,801,529
[45] Date of Patent: Sep. 1, 1998

[54] MAGNETORESISTANCE SENSING DEVICE WITHOUT HYSTERSIS INFLUENCE

[75] Inventors: Hideki Umemoto; Naoki Hiraoka; Wataru Fukui; Yutaka Ohashi; Masahiro Yokotani, all of Tokyo, Japan

[73] Assignee: Mitsubishi Denki Kabushiki Kaisha, Tokyo, Japan

[21] Appl. No.: 740,623

[22] Filed: Oct. 31, 1996

[30] Foreign Application Priority Data

Jun. 10, 1996 [JP] Japan .................................. 8-147554

[51] Int. Cl.$^6$ .................. G01B 7/14; G01R 33/06; F62B 53/06
[52] U.S. Cl. .................. 324/207.12; 324/207.21; 338/32 R
[58] Field of Search .................. 324/207.21, 207.12, 324/207.24, 207.25, 252, 235; 338/32 R

[56] References Cited

U.S. PATENT DOCUMENTS 5,021,736  6/1991  Gonsalves et al. .................. 324/207.21

OTHER PUBLICATIONS

*Journal of Magnetics Society of Japan*, vol. 15, No. 51991, pp. 813 to 820 (No Translation).

*Primary Examiner*—Walter E. Snow
*Attorney, Agent, or Firm*—Sughrue, Mion, Zinn, Macpeak & Seas, PLLC

[57] ABSTRACT

The invention provides a sensing device capable of outputting a correct signal precisely corresponding to a particular position (angle) of, for example a protruding or recessed portion of a rotating member made of a magnetic material. The sensing device includes: a magnet for generating magnetic field; a rotary member of magnetic material for changing a magnetic field generated by the magnet, the rotary member of magnetic material being disposed a predetermined distance apart from the magnet; and a giant magnetoresistance device for detecting the varying magnetic field, the operating range of the giant magnetoresistance device being set such that the change in resistance of the giant magnetoresistance device is uniform over the entire operating range in both directions of change in the magnetic field induced by the rotary member of magnetic material, wherein the giant magnetoresistance device is disposed in such a manner that the center of the magnetic field sensing plane of the giant magnetoresistance device deviates from the center of the magnet in a direction parallel to a plane containing the displacement direction of the rotary member of magnetic material.

14 Claims, 15 Drawing Sheets

FIG. 14
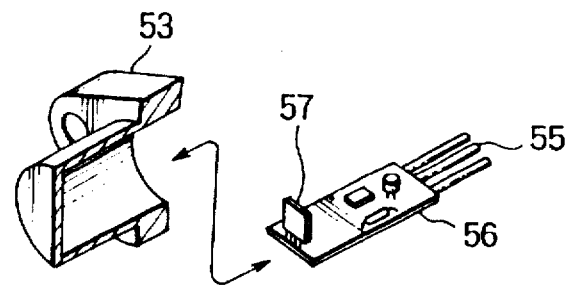
FIG. 15
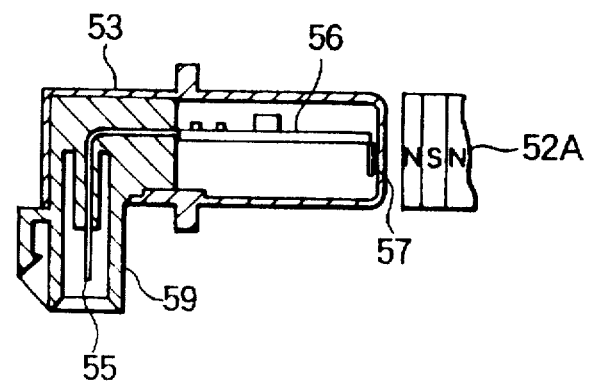
FIG. 16
(a)
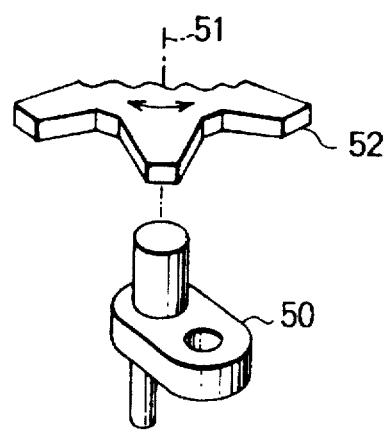
(b)
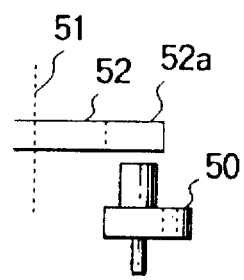

FIG. 17
(a)
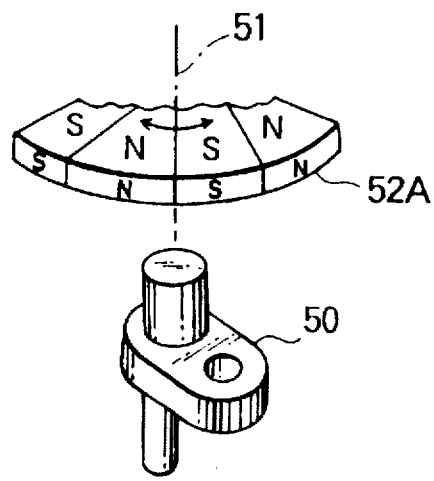
(b)
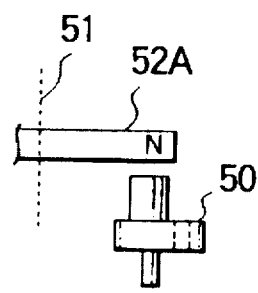
FIG. 18
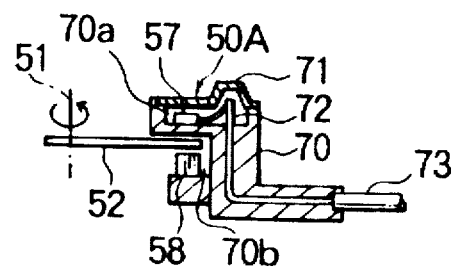

MAGNETORESISTANCE SENSING DEVICE WITHOUT HYSTERSIS INFLUENCE

BACKGROUND OF THE INVENTION

1. Field of the Invention

The present invention relates to a sensing device for detecting the change in a magnetic field caused by the motion of a moving member of magnetic material, and more particularly, to a sensing device which is particularly suitable for detecting information about the rotation of for example an internal combustion engine.

2. Description of the Related Art

Magnetoresistance devices generally refer to those devices which change in resistance in response to the direction of a magnetic field applied to a thin ferromagnetic film with respect to the direction of a current flowing through the thin ferromagnetic film.

Magnetoresistance devices have minimum resistance when a magnetic field is applied in a direction at a right angle to the direction of current. On the other hand, when the angle between the direction of the current and the direction of the applied magnetic field is 0, that is when a magnetic field is applied in a direction the same as or opposite to the direction of current, the resistance has a maximum value. The change in the resistance is generally called the magnetoresistance effect, and the magnitude of the change in the resistance is referred to as the magnetoresistance variation ratio. A typical value of magnetoresistance variation ratio is 2 to 3% for Ni-Fe and 5 to 6% for Ni-Co.

FIG. 22 is a schematic diagram illustrating the construction of a conventional sensing device, wherein its side view and perspective view are shown in FIG. 22a and FIG. 22b, respectively.

The sensing device shown in FIG. 22 includes: a rotating shaft 1; a rotary member of magnetic material 2 having at least one protruding or recessed portion wherein the rotary member of magnetic material 2 is adapted to rotate in synchronization with the rotation of the rotating shaft 1; a magnetoresistance device 3 disposed at a location a predetermined distance apart from the rotary member of magnetic material 2; and a magnet 4 for applying a magnetic field to the magnetoresistance device 3. In the above construction, the magnetoresistance device 3 includes a magnetoresistance pattern 3a and a thin film surface (magnetic field sensing plane) 3b.

If the rotary member of magnetic material 2 rotates, the magnetic field applied to the magnetic field sensing plane 3b of the magnetoresistance device 3 changes in response to the rotation of the rotary member of magnetic material 2, and, as a result, the resistance of the magnetoresistance pattern 3a changes correspondingly.

The output level of MR devices employed in the conventional sensing devices is low and thus the detection accuracy is not good enough.

To avoid the above problems, a magnetic field sensing element capable of outputting a very large output signal, called a giant magnetoresistance device (hereafter referred to simply as a GMR device), has been proposed recently.

The giant magnetoresistance device has a multilayer structure consisting of alternately grown magnetic layers and non-magnetic layers each having a thickness in the range from a few Å to a few ten of Å. Such a multilayer structure is known as the superlattice structure, and a specific example is disclosed in a paper entitled "Magnetoresistance effect of multilayers" published in the Journal of Magnetics Society of Japan, Vol. 15, No. 51991, pp. 813 to 821. Specific structures includes (Fe/Cr)n, (permalloy/Cu/Co/Cu)n, (Co/Cu)n, etc. These superlattice structures exhibit much greater magnetoresistance effect (giant magnetoresistance effect) than conventional magnetoresistance devices. In these giant magnetoresistance devices with a superlattice structure, the magnetoresistance effect depends only on the relative angle between magnetization of adjacent magnetic layers, and therefore the change in resistance does not depend on the direction of the external magnetic field applied with respect to the direction of current (this property is referred to as "in-plane magnetic field sensitivity).

In view of the above, the magnetic field sensing plane for detecting the change in the magnetic field is formed substantially with giant magnetoresistance devices wherein electrodes are formed so that the respective giant magnetoresistance devices are connected in such a manner as to form a bridge circuit. Two opposite nodes of the bridge circuit are connected to a constant voltage source or a constant current source so that the change in resistance of the giant magnetoresistance devices is converted into the change in voltage thereby detecting the change in the magnetic field applied to the giant magnetoresistance devices.

FIG. 23 is a block diagram illustrating the construction of the sensing device using the giant magnetoresistance devices having hysteresis described above, wherein FIGS. 23a and 23b are a side view and a perspective view thereof, respectively.

The sensing device includes: a rotating shaft 1; a rotary member of magnetic material 2 serving as magnetic field variation inducing means, the rotary member of magnetic material 2 having at least one protruding or recessed portion, the rotary member of magnetic material 2 being adapted to rotate in synchronization with the rotation of the rotating shaft 1; a magnetic field sensing element, for example, a giant magnetoresistance device 10 disposed in a radial direction from the rotary member of magnetic material 2 at a location a predetermined distance apart from the rotary member of magnetic material 2; and a magnet 4 serving as magnetic field generating means for supplying a magnetic field to the giant magnetoresistance device 10, wherein the giant magnetoresistance device 10 includes a magnetoresistance pattern 10a serving as a magnetic field sensing pattern and a thin film plane (magnetic field sensing plane) 10b.

If the rotary member of magnetic material 2 rotates, the magnetic field applied to the magnetic field sensing plane 10b of the giant magnetoresistance device 10 changes, and thus the resistance of the magnetoresistance pattern 10a changes correspondingly.

As shown in FIG. 24, the film thicknesses of the magnetic and non-magnetic layers are also optimized within the range of from a few Å to a few tens of Å so that the GMR device 10 has a desirable hysteresis in the characteristic of resistance versus applied magnetic field.

FIG. 25 is a block diagram illustrating the construction of the sensing device using the giant magnetoresistance devices having hysteresis described above.

The sensing device includes: a Wheatstone bridge circuit 11 including giant magnetoresistance devices disposed a predetermined distance apart from the rotary member of magnetic material 2 so that a magnetic field is applied from a magnet 4 to the giant magnetoresistance devices; a differential amplifier 12 for amplifying the output signal of the Wheatstone bridge circuit 11; a comparator 13 for comparing the output of the AC coupling circuit 20 with a reference value and outputting a "0" signal or a "1" signal depending on the comparison result; a waveform shaping circuit 14 for shaping the waveform of the output of the comparator 13 and supplying a "0" or "1" signal having sharp rising and falling edges to the output terminal 15.

FIG. 26 is a circuit diagram illustrating a specific example of the circuit shown in FIG. 25.

The Wheatstone bridge circuit 11 includes branches 10A, 10B, 10C, and 10D which are each formed with a giant magnetoresistance device. One end of the giant magnetoresistance device 10A and one end of the giant magnetoresistance device 10C are connected in common to each other, and the node 16 between these devices 10A and 10C is connected to the power supply terminal Vcc. One end of the giant magnetoresistance device 10B and one end of the giant magnetoresistance device 10D are connected in common to each other, and the node 17 between these devices 10B and 10D is grounded. The other ends of the giant magnetoresistance devices 10A and 10B are connected to a node 18, while the other ends of the giant magnetoresistance devices 10C and 10D are connected to a node 19.

The node 18 of the Wheatstone bridge circuit 11 is connected, via a resistor, to the inverting input of the amplifier 12a constituting the differential amplifier 12. The node 19 is connected, via a resistor, to the non-inverting input of the amplifier 12a wherein the non-inverting input of the amplifier 12a is further connected, via a resistor, to a voltage divider constituting a reference power supply.

The output terminal of the amplifier 12a is connected to the inverting input terminal of the comparator 13. The non-inverting input terminal of the comparator 13 is connected to a voltage divider constituting a reference power supply which is composed of resistors 21 and 22, and also connected via a resistor to the output terminal of the comparator 13.

The output of the comparator 13 is also connected to the base of a transistor 14a. The collector of the transistor 14a is connected to the output terminal 15 and also to a power supply terminal Vcc via a resistor. The emitter of the transistor 14a is grounded.

The operation will be firstly described below with reference to FIG. 27.

If the rotary member of magnetic material 2 rotates, the magnetic field applied to the giant magnetoresistance devices 10A to 10D changes in response to the passage of the protruding and recessed portions of the rotary member of magnetic material 2 as shown in FIG. 27a, wherein the magnetic field applied to the magnetoresistance devices 10A and 10D is, in effect, opposite in phase to that applied to the magnetoresistance devices 10B and 10C. The above change in the magnetic field is detected by the magnetoresistance devices 10A and 10D, and also by the magnetoresistance devices 10B and 10C wherein the phase of the magnetic field detected by the magnetoresistance devices 10A and 10D becomes opposite to that detected by the magnetoresistance devices 10B and 10C. As a result, the overall magnitude of the change in the magnetic field becomes, in effect, four times greater than that which can be sensed by a single giant magnetoresistance device.

A corresponding change in resistance occurs in each giant magnetoresistance device. Thus, the giant magnetoresistance devices 10A and 10D have maximum and minimum resistances at locations opposite in phase to those where the giant magnetoresistance elements 10B and 10C have maximum and minimum resistances. As a result, the voltages at the nodes 18 and 19 (mid-point voltages) of the Wheatstone bridge circuit 11A also change in a similar fashion.

The difference in the mid-point voltage is amplified by the differential amplifier 12. As shown in FIG. 27b, the differential amplifier 12 outputs a signal corresponding to the protruding and recessed portions of rotating member 2 of magnetic material shown in FIG. 27a. Thus, the output signal of the differential amplifier 12 is substantially four times greater than that obtained by a single GMR device.

The output of this differential amplifier 12 is applied to the comparator 13 so as to make comparison with reference voltages $V_{T1}$, $V_{T2}$. The comparator 13 outputs a "0" or "1" signal in accordance with the comparison result. The waveform of this signal is then shaped by the waveform shaping circuit 14. As a result, an output signal having a "0" or "1" level with sharp rising and falling edges is provided via the output terminal 15 as shown in FIG. 27c.

However, the conventional sensing devices using a GMR device have the following problems.

That is, GMR devices used in the conventional sensing devices exhibit hysteresis in characteristic of resistance versus applied magnetic field, as shown in FIG. 24. As a result, as can be seen from FIG. 27, in the operation of detecting the protruding and recessed portions of the rotating member of magnetic material, the output signal varies at each edge. Furthermore, the signal level for protruding portions is not equal to that for recessed portions.

In the above conventional sensing device, the output signal $V_{DO}$ of the differential amplifier 12 is compared with the reference values or the comparison levels $V_{T1}$, $V_{T2}$ via the comparison circuit 13 thereby generating a signal corresponding to the protruding and recessed portions of the rotating member 2 of magnetic material. However, the above-described hysteresis varies depending on various factors such as the variation in characteristic of GMR devices 10 constituting the bridge circuit and the variation in temperature coefficient. As a result, as represented by the broken line in FIG. 27, the output $V_{DO}$ of the differential amplifier 12 deviates from the reference values $V_{T1}$, $V_{T2}$ as represented by mark D and thus the output signal does not correspond exactly to the protruding and recessed portions of the rotating member 2 of magnetic material.

It is a general object of the present invention to solve the above problems. More specifically, it is an object of the present invention to provide a sensing device capable of outputting a correct signal precisely corresponding to a particular position (angle) such as a protruding or recessed portion of a rotating member made of a magnetic material.

SUMMARY OF THE INVENTION

According to an aspect of the present invention, there is provided a sensing device including: magnetic field generation means for generating magnetic field; magnetic field variation inducing means for changing a magnetic field generated by the magnetic field generation means, the magnetic field variation inducing means being disposed a predetermined distance apart from the magnetic field generation means; and a giant magnetoresistance device for detecting the varying magnetic field, the operating range of the giant magnetoresistance device being set such that the change in resistance of the giant magnetoresistance device is uniform over the entire operating range in both directions of change in the magnetic field induced by the magnetic field variation inducing means, wherein the giant magnetoresistance device is disposed in such a manner that the center of the magnetic field sensing plane of the giant magnetoresistance device deviates from the center of the magnetic field generation means in a direction parallel to a plane containing the displacement direction of the magnetic field variation inducing means. In this arrangement, the hysteresis of the GMR device no longer has influence on the output of the differential amplifier; and it is thus possible to obtain an output signal precisely corresponds to a predetermined portion (angle) of the magnetic field variation inducing means. Furthermore, since a great output signal is obtained, the detection accuracy is improved, and the detection is not easily disturbed by external noise, that is, the signal-to-noise ratio is improved.

In one form of the invention, a bridge circuit is constructed using the giant magnetoresistance devices so that the magnetic field applied to the giant magnetoresistance device disposed at one branch of the bridge circuit is opposite in polarity to that applied to the giant magnetoresistance device disposed at another branch of the bridge circuit. According to this arrangement, the hysteresis of the GMR device no longer has influence on the output of the differential amplifier; and it is thus possible to obtain an output signal precisely corresponds to a predetermined portion (angle) of the magnetic field variation inducing means. Furthermore, since a great output signal is obtained, the detection accuracy is improved, and the detection is not easily disturbed by external noise, that is, the signal-to-noise ratio is improved.

In another form of the invention, the magnetic field variation inducing means is composed of a moving member of magnetic material provided with at least one protruding or recessed portion. According to this arrangement, it becomes possible to detect smaller protruding or recessed portions, and therefore it is possible to realize a small-sized and low-cost sensing device with improved detection accuracy.

In a further form of the invention, the magnetic field generation means and the magnetic field variation inducing means are formed into a moving member of magnetic material provided with at least one magnetic pole so that the moving member of magnetic material generates a magnetic field which changes in accordance with movement of the moving member. According to the above arrangement, it becomes possible to start providing a correct output signal precisely corresponding to the location of the magnetic pole of the magnet provided on the moving member of magnetic material as soon as the power of the sensing device is turned on.

In a still further form of the invention, the moving member of magnetic material is a rotary member which rotates in synchronization with a rotating shaft. This arrangement ensures that the sensing device can precisely detect the change in the magnetic field caused by the rotation of the rotary member of magnetic material.

In a yet further form of the invention, the sensing device includes a main part of the sensing device provided with the giant magnetoresistance device, the rotary member being mounted on a crank shaft or a cam shaft of an internal combustion engine, the main part of the sensing device being disposed adjacent to the internal combustion engine so that the rotary member faces the giant magnetoresistance device. This arrangement makes it possible to achieve a small-sized and high-precision sensing device which can precisely detect the rotation angle (rotation speed) of the crank shaft or the cam shaft of an internal combustion engine. As a result, it becomes possible to precisely control the internal combustion engine. Furthermore, the sensing device can be easily mounted in a highly reliable fashion on an internal combustion engine without requiring a large mounting space.

In still another form of the invention, the main part of the detecting apparatus is disposed at a location away from the rotary member in a direction along the axis of the rotating shaft. In this arrangement, the space near the rotating shaft can be effectively utilized to install the main part of the sensing device. This means that no additional space in a radial direction is required to install the main part of the sensing device, and therefore it is possible to further reduce the size of the sensing device.

In still another form of the invention, the main part of the detecting apparatus includes a housing in which the giant magnetoresistance device is disposed, and the rotary member is disposed in a space on a side of the housing in such a manner that at least the periphery of the rotary member faces the giant magnetoresistance device. In this arrangement, a magnetic path is formed through the rotary member and the giant magnetoresistance device. Therefore, this structure has,in effect,the same function as the rotary member of magnetic material at least a part of which is formed of a magnet. As a result, in this structure, it becomes possible to start providing a correct out put signal precisely corresponding to the rotation angle of the rotary member as soon as the power of the sensing device is turned on.

7

Figure 19:
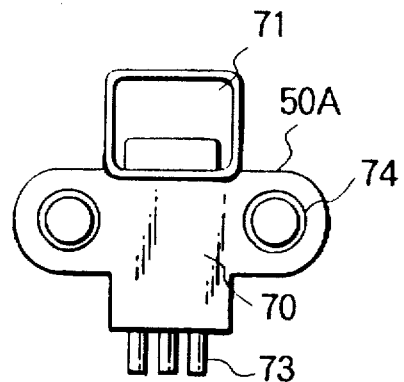
Figure 20:
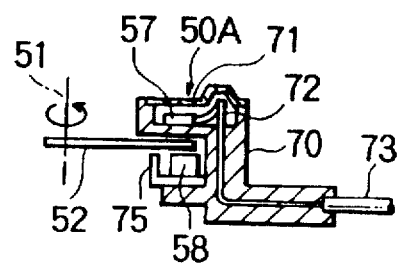
Figure 21:
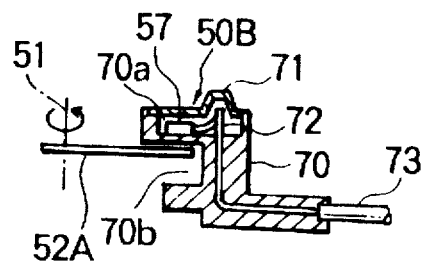
Figure 22:
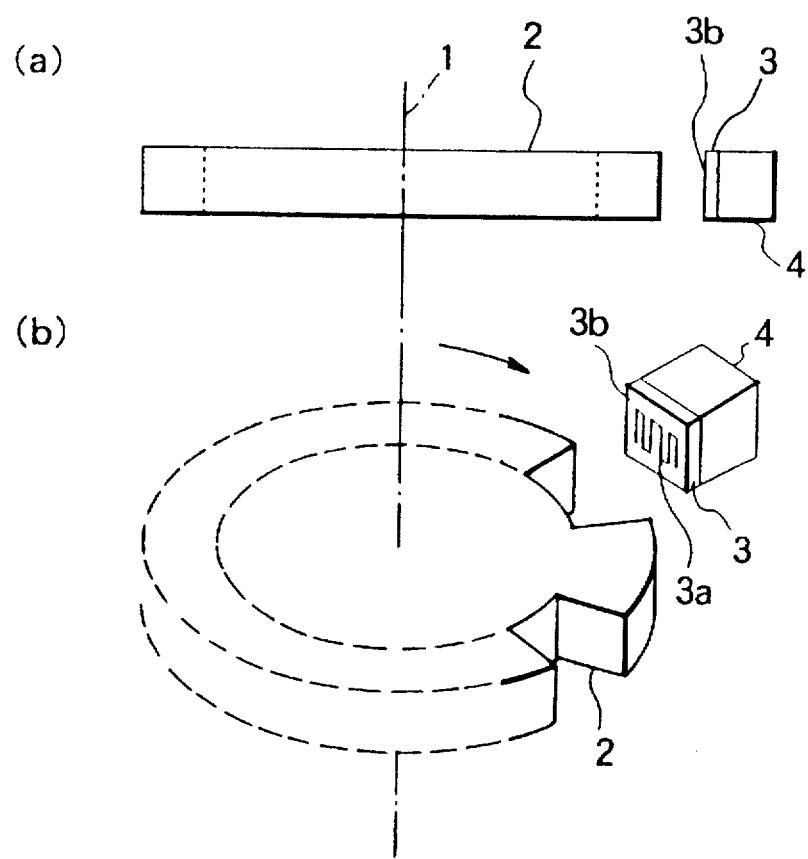
Figure 24:
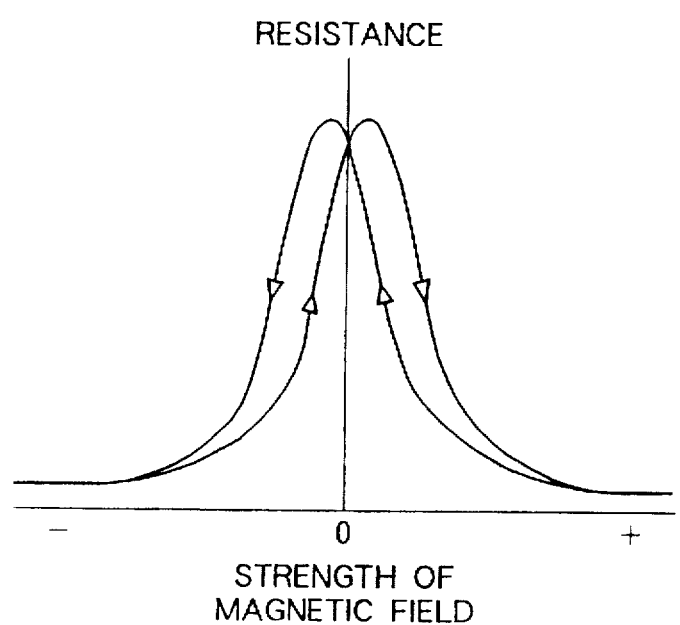
Figure 25:
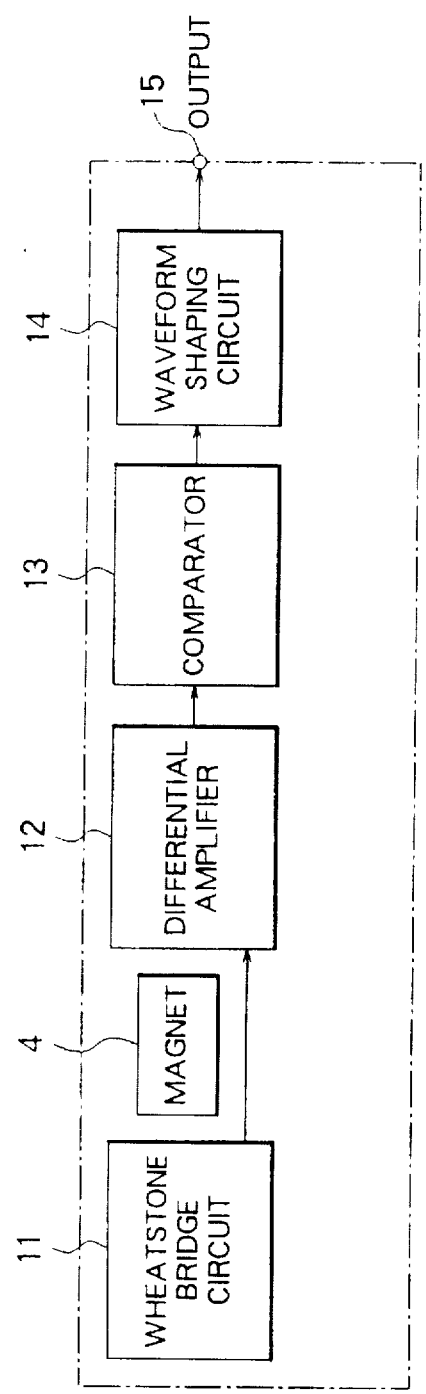
Figure 26:
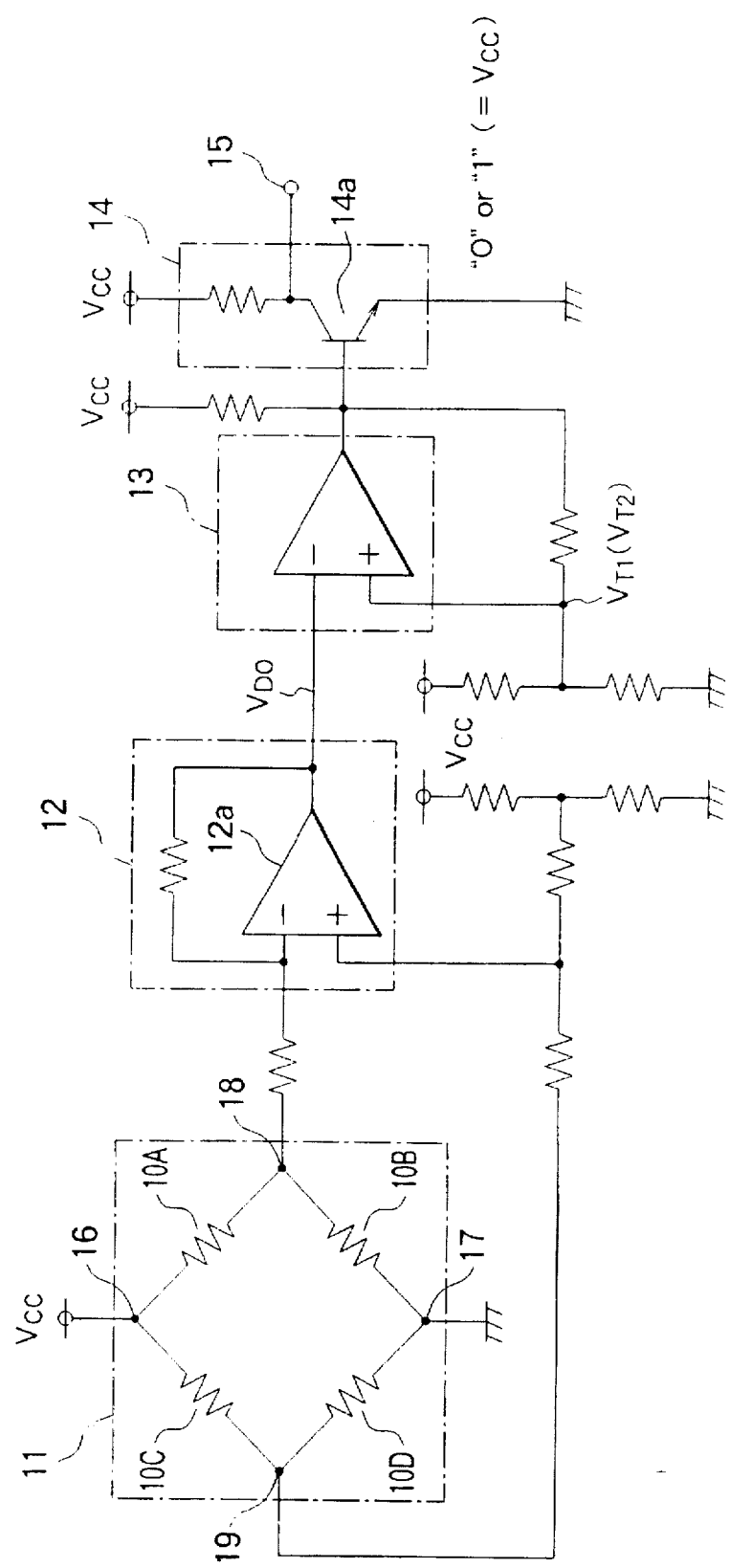
Figure 27:
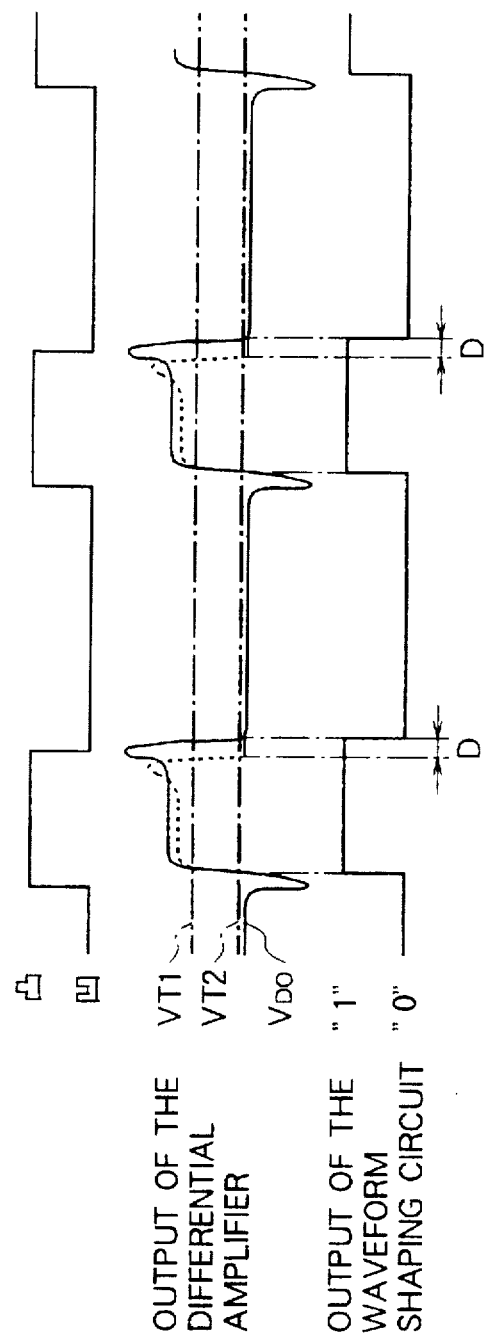

FIG. 14 is an exploded view illustrating the internal structure of the main part of the sensing device of the fifth embodiment according to the present invention;

FIG. 15 is a sectional side view illustrating a modified example of the main part of the sensing device based on the fifth embodiment of the invention;

FIGS. 16(a) and 16(b) are schematic diagrams illustrating a sixth embodiment of a sensing device according to the present invention;

FIGS. 17(a) and 17(b) are schematics diagrams illustrating a seventh embodiment of a sensing device according to the present invention;

FIG. 18 is a sectional side view illustrating an eighth embodiment of a sensing device according to the present invention;

FIG. 19 is a perspective view illustrating the main part of the sensing device of the eighth embodiment according to the present invention;

FIG. 20 is a sectional side view illustrating a modified example of the main part of the sensing device based on the eighth embodiment of the invention;

FIG. 21 is a sectional side view illustrating a nineth embodiment of a sensing device according to the present invention;

FIGS. 22(a) and 22(b) are schematic diagrams illustrating a conventional sensing device;

FIGS. 23(a) and 23(b) are schematic diagrams illustrating a conventional sensing device using a GMR device;

FIG. 24 is a characteristic diagram illustrating the change of resistance of a GMR device versus length of a magnetic field;

FIG. 25 is a simplified circuit diagram illustrating a sensing device using a GMR device;

FIG. 26 is a circuit diagram illustrating a specific example of the circuit of FIG. 25 ; and FIG. 27 is a waveform diagram illustrating the operation relating to FIG. 26.

DESCRIPTION OF THE PREFERRED EMBODIMENTS

With reference to preferred embodiments, the sensing device according to the present invention will be described in greater detail below in connection with the accompanying drawings.

Embodiment 1

Figure 1:
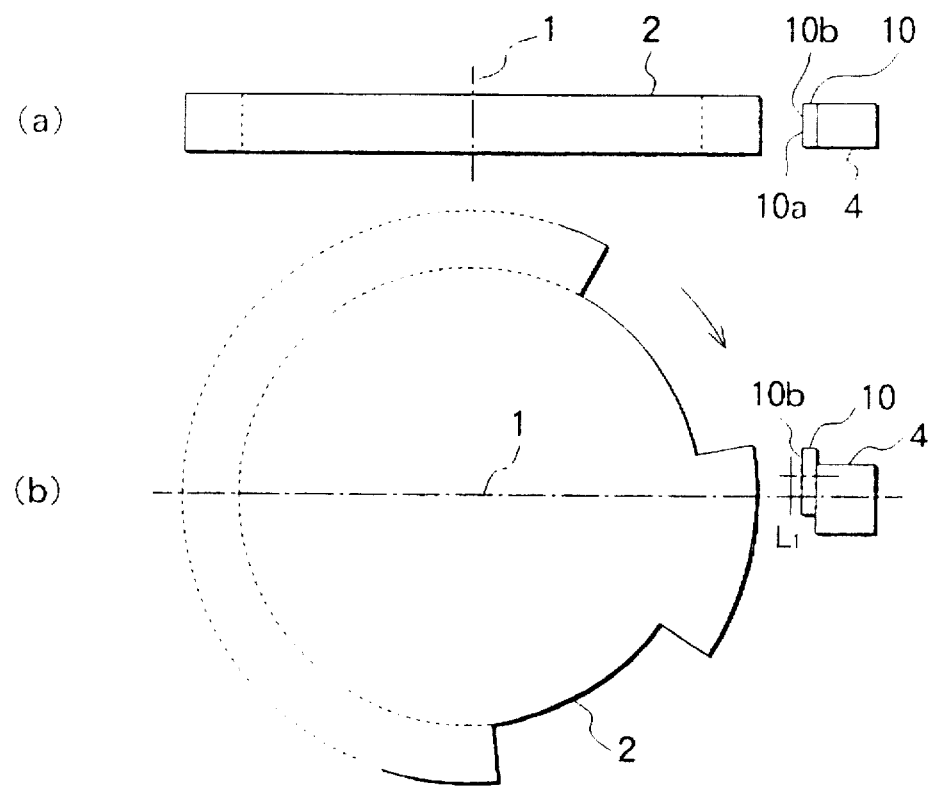
FIGS. 1(a) and 1(b) are schematic diagrams illustrating a first embodiment of a sensing device according to the present invention.
Figure 23:
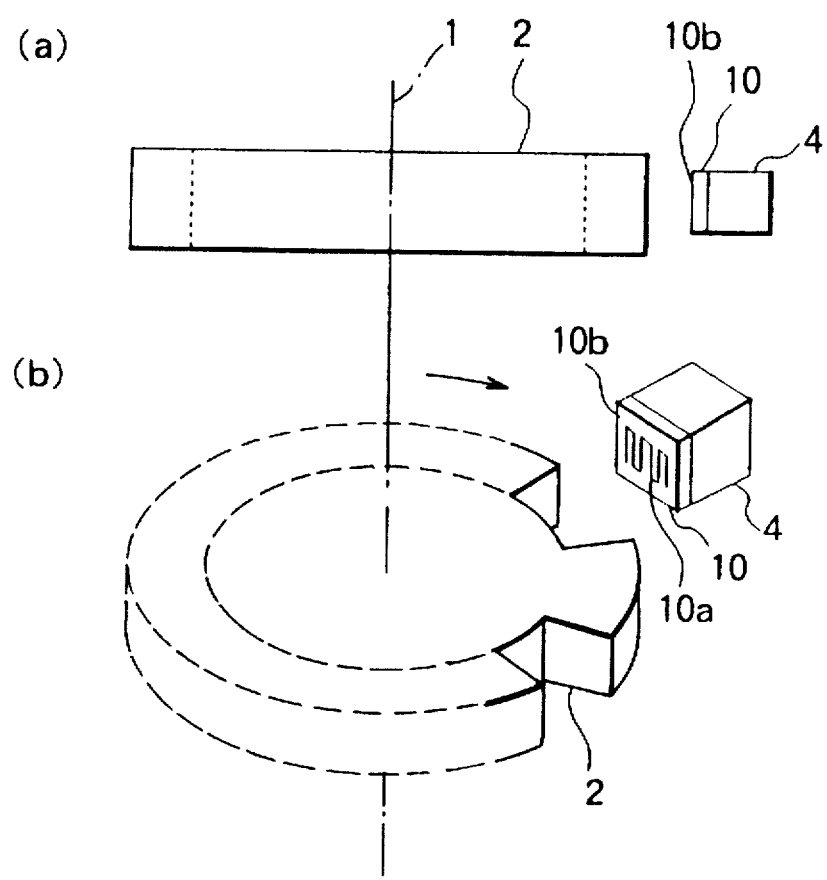

FIG. 1 is a schematic diagram illustrating a first embodiment of a sensing device according to the present invention, wherein FIGS. 1a and 1b are a side view and a perspective view thereof, respectively. In FIG. 1, similar elemens and parts to those in FIG. 23 are denoted by similar reference numerals and will not be described here in further detail.

Figure 2:
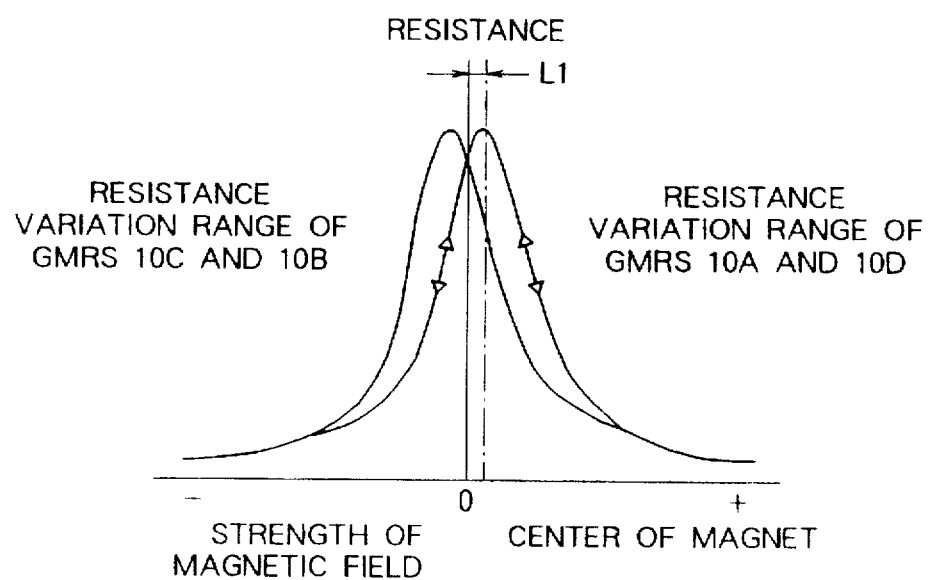
FIG. 2 is a characteristic diagram illustrating the change of resistance of the GMR device versus length of a magnetic field at the first embodiment of the sensing device according to the present invention.

In this embodiment, the GMR devices are disposed in such a manner that there is a deviation between the center of the magnetic field sensing plane of the GMR device and the center of the magnet so that the sensing operation occurs, in effect, at an operating point with a greater hysteresis, as shown in FIG. 2.

More specifically, as shown in FIG. 1b, the GMR device 10 is disposed so that the center of the magnetic field sensing plane 10b of the GMR device 10 is shifted by a predetermined amount $L_1$ from the center of the magnet 4 for example in a direction opposite to the rotation direction of the rotating member 2 of magnetic material. The specific value of $L_1$ is preferably within the range from 0.1 to 10 mm while the optimum value depends on the size of the GMR device. Except for the above point, the construction of the present embodiment is similar to that shown in FIG. 23, and the circuit configuration is also similar to that shown in FIG. 25 or 26. Therefore, these figures are also referred to in the following description of the present embodiment.

Figure 3:
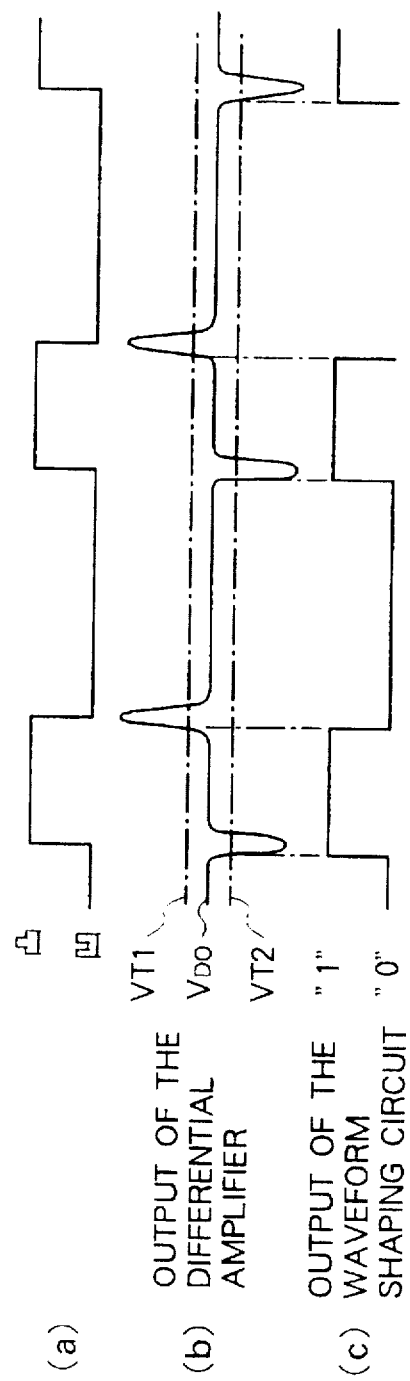
FIG. 3 is a waveform diagram illustrating the operation relating to the first embodiment of the sensing device according to the present invention.

The operation will be first described below with reference to FIG. 3.

If the rotary member of magnetic material 2 rotates, the magnetic field applied to the giant magnetoresistance devices 10A to 10D changes in response to the passage of the protruding and recessed portions of the rotary member of magnetic material 2 as shown in FIG. 3a, wherein the magnetic field applied to the magnetoresistance devices 10A and 10D is, in effect, opposite in phase to that applied to the magnetoresistance devices 10B and 10C. The above change in the magnetic field is detected by the magnetoresistance devices 10A and 10D, and also by the magnetoresistance devices 10B and 10C wherein the phase of the magnetic field detected by the magnetoresistance devices 10A and 10D becomes opposite to that detected by the magnetoresistance devices 10B and 10C. As a result, the overall magnitude of the change in the magnetic field becomes, in effect, four times greater than that which can be sensed by a single giant magnetoresistance device.

A corresponding change in resistance occurs in each giant magnetoresistance device. Thus, the giant magnetoresistance devices 11A and 10D have maximum and minimum resistances at locations opposite in phase to those where the giant magnetoresistance elements 10B and 10C have maximum and minimum resistances. As a result, the voltages at the nodes 18 and 19 (mid-point voltages) of the Wheatstone bridge circuit 11 also change in a similar fashion.

In the output signal of the GMR device which exhibits hysteresis in resistance characteristics versus applied magnetic field, there is a difference in the resistance variation range, as shown in FIG. 2, between the GMR devices 10A, 10D and the GMR devices 10C, 10B although the GMR devices 10A to 10D themselves operate in basically the same manner as shown in FIG. 24.

Thus, the deviation in the location of the center of magnetic field sensing plane of the GMR device relative to the center of the magnet leads to a greater difference, as shown in FIG. 2, in the output signal provided as the mid-point voltage $V_{N1}$ ($>V_N$) at the nodes 18, 19 of the Wheatstone bridge circuit 11 between the signal corresponding to the protruding portions and that corresponding to the recessed portions of the rotating member 2 of magnetic material.

The difference in the mid-point voltage is amplified by the differential amplifier 12. As shown in FIG. 3b, the differential amplifier 12 outputs a signal corresponding to the protruding and recessed portions of rotating member 2 of magnetic material shown in FIG. 3a. Thus, the output signal of the differential amplifier 12 is substantially four times greater than that obtained by a single GMR device.

The output of this differential amplifier 12 is applied to the comparator 13 so as to make comparison with reference voltages to $V_{T1}$, $V_{T2}$. The comparator 13 outputs a "0" or "1" signal in accordance with the comparison result. The waveform of this signal is then shaped by the waveform shaping circuit 14. As a result, an output signal having a "0" or "1" level with sharp rising and falling edges is provided via the output terminal 15 as shown in FIG. 3c.

As described above, in this embodiment, the magnet is disposed in such a manner that the center of the magnet deviates by an amount of $L_1$ so that the center of the magnet is located, as shown in FIG. 2, at a position corresponding to a peak in the characteristic curve of the GMR device in terms of resistance versus applied magnetic field and thus the resistance thereby achieving symmetry between the resistance variation range of the GMR devices 10A and 10D on one side of the bridge circuit and that of the GMR devices 10C and 10B on the other side of the bridge circuit.

In this case, the bridge circuit provides an output signal output $V_{DO}$ via the differential amplifier 12 as shown in FIG. 3b. As can be seen from FIG. 3b, the output signal changes at each edge of the protruding and recessed portions of the rotating member 2 of magnetic material wherein there is no difference in output level between recessed portions and protruding portions and thus the hysteresis of the GMR devices no longer has influence on the output of the differential amplifier 12.

The output signal of the differential amplifier 12 is compared with the reference values or the comparison levels $V_{T1}$, $V_{T2}$ via the comparison circuit 13 thereby generating a precise signal which always corresponds to the protruding and recessed portions of the rotating member 2 of magnetic material.

As described above, the GMRs devices having hysteresis in characteristic of resistance versus applied magnetic field are disposed in such a manner that the center of the magnetic field sensing plane of the GMR devices deviates from the center of the magnet thereby achieving symmetry between the resistance variation range of GMR devices on one side of the bridge circuit and that of GMR devices on the other side of the bridge circuit. As a result, the output changes at each edge of the protruding and recessed portions of the rotating member of magnetic material; there is no longer difference in the output level between the protruding portions and the recessed portions; the hysteresis of the GMR device no longer has influence on the output of the differential amplifier; and thus the output signal precisely corresponds to the protruding and recessed portions of the rotating member of magnetic material.

Furthermore, since a great output signal is obtained, the detection accuracy is improved, and the detection is not easily disturbed by external noise, that is, the signal-to-noise ratio is improved.

Although the Wheatstone bridge circuit constructed with GMR devices is employed in this specific embodiment, other similar circuit configurations may also be employed.

Embodiment 2

Figure 4:
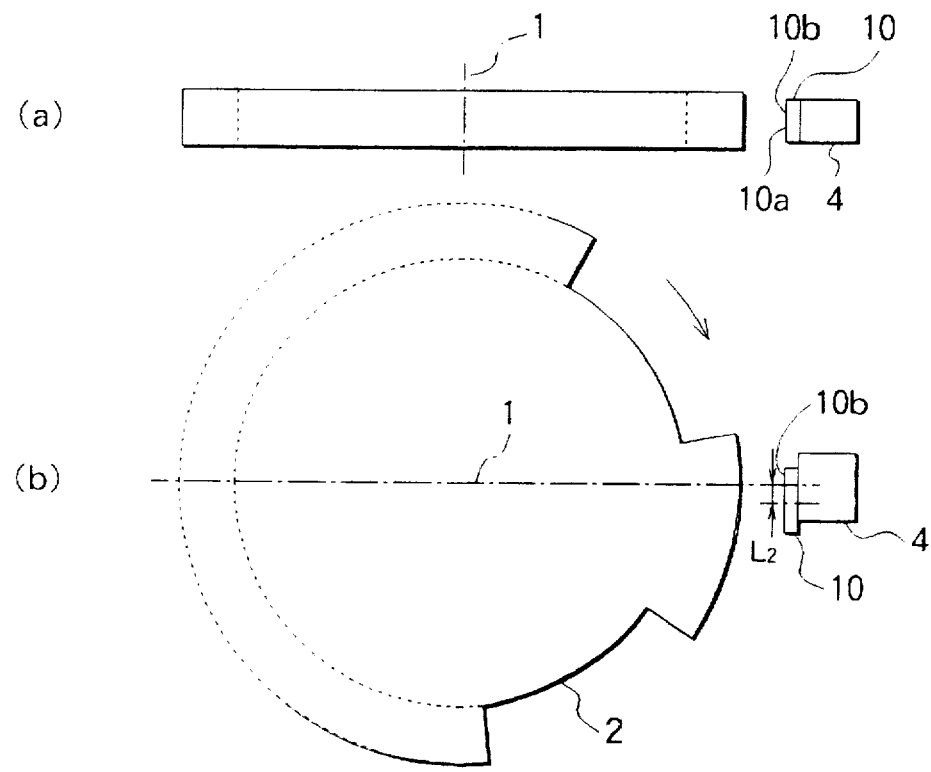
FIGS. 4(a) and 4(b) are schematic diagrams illustrating a second embodiment of a sensing device according to the present invention.

FIG. 4 is a schematic diagram illustrating a third embodiment of the present invention, wherein its side view and plan view are shown in FIGS. 4a and 4b, respectively.

Figure 5:
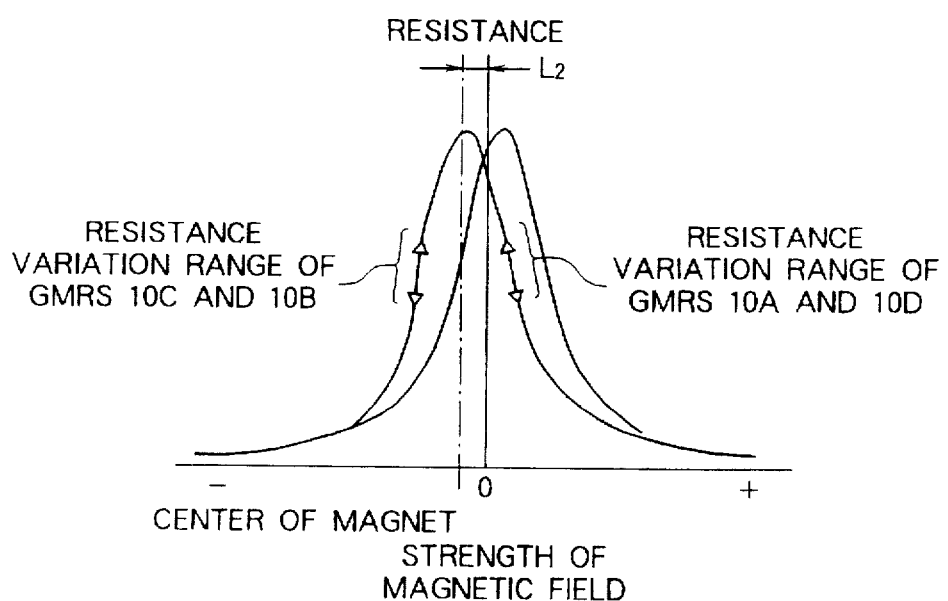
FIG. 5 is a characteristic diagram illustrating the change of resistance of the GMR device versus length of a magnetic field at the second embodiment of the sensing device according to the present invention.

In the first embodiment described above, the GMR device having hysteresis in resistance characteristics versus applied magnetic field is disposed so that the center of the magnetic field sensing plane of the GMR device is shifted relative to the center of the magnet in a direction opposite to the rotation direction of the rotating member of magnetic material. In contrast, in the present embodiment, the GMR device is shifted in the same direction as the direction of rotation of the rotating member of magnetic material so that the sensing operation occurs at a greater hysteresis point as shown in FIG. 5.

More specifically, as shown in FIG. 4b, the GMR device 10 is disposed so that the center of the magnetic field sensing plane 10b of the GMR device 10 is shifted for example by a predetermined amount $L_2$ from the center of the magnet 4 in a direction opposite to the rotation direction of the rotating member 2 of magnetic material. The specific value of $L_2$ is preferably within the range of from 0.1 to 10 mm while the optimum value depends on the size of the GMR device. Except for the above point, the construction of the present embodiment is similar to that shown in FIG. 1, and the circuit configuration is also similar to that shown in FIG. 25 or 26. Therefore, these figures are also referred to in the following description of the present embodiment. Excepting that the resistance variation ranges of the GMR devices 10A, 10D and GMR devices 10C, 10B are sifted to an another characteristics with the same corresponding relation as shown in FIGS. 2 and 5, the operation of the present embodiment is similar to that of the above embodiments.

In the present embodiment, as described above, the GMR device whose thickness is optimized so that the characteristic of resistance versus applied magnetic field has desirable hysteresis is disposed in such a manner that the center of the magnetic field sensing plane is shifted from the center of the magnet thereby achieving great hysteresis. This makes it possible to achieve symmetry in the resistance variation range between the two GMR devices on one side of the bridge circuit and the other two GMR devices on the other side of the bridge circuit. As a result, the output changes at each edge of the protruding and recessed portions of the rotating member of magnetic material; there is no longer difference in the output level between the protruding portions and the recessed portions; the hysteresis of the GMR devices no longer has influence on the output of the differential amplifier; and thus the output signal precisely corresponds to the protruding and recessed portions of the rotating member of magnetic material.

Furthermore, since the detected output signal has a greater signal level, the detection accuracy is further improved, and the detection is not easily disturbed by external noise, that is, the signal-to-noise ratio is improved.

Although the Wheatstone bridge circuit constructed with GMR devices is employed in this specific embodiment, other similar circuit configurations may also be employed.

Embodiment 3

Figure 6:
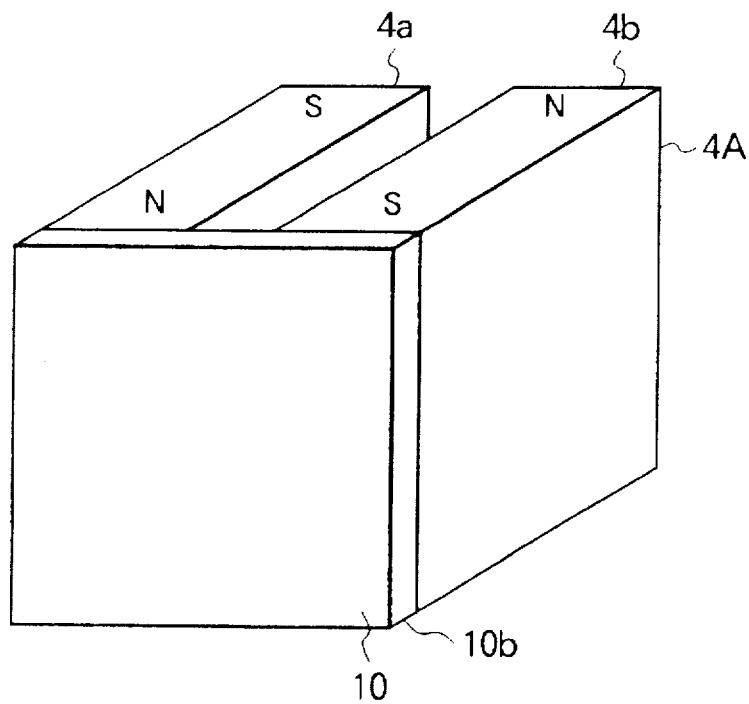
FIG. 6 is a schematic diagram illustrating a third embodiment of a sensing device according to the present invention.

FIG. 6 is a schematic diagram illustrating a third embodiment of the present invention. In this figure, similar elements and portions to those in FIG. 1 are denoted by similar reference numerals.

In the first and second embodiments described above, the GMR device is disposed in such a manner that the center of the magnetic field sensing plane of the GMR device deviates from the center of the magnet to the position corresponding to the peak in the resistance versus applied magnetic field curve. In contrast, in the present embodiment, a similar effect is achieved by applying a magnetic field to the GMR devices constituting the bridge circuit in such a manner that the polarity of the magnetic field applied to a certain GMR device is opposite to that applied to another GMR device.

To the above end, in the present embodiment, two magnetic poles, that is, N- and S-poles are provided in the magnetic field generation means.

More specifically, as shown in FIG. 6, instead of the magnet 4 employed in the previous embodiment, a magnet 4A including two magnet elements 4a and 4b is employed as the magnetic field generation means. The magnet 4A is disposed in such a manner that the magnetic field sensing planes 10b of the GMR devices 10A and 10D face for example the N-pole of the magnet element 4a of the magnet 4A and the magnetic field sensing planes 10b of the GMR devices 10C and 10B face the S-pole of the magnet element 4b, of the magnet 4A so that the GMR devices 10A and 10D disposed on one side of the Wheatstone bridge circuit encounter a magnetic field having a polarity opposite to that applied to the GMR devices 10C and 10B disposed on the other side of the Wheatstone bridge circuit. Except for the above point, the construction of the present embodiment is similar to that shown in FIG. 1, and the circuit configuration is also similar to that shown in FIG. 25 or 26. Therefore, these figures are also referred to in the following description of the present embodiment. Excepting that the resistance variation ranges of the GMR devices 10A, 10D and GMR devices 10C, 10B are sifted to an another characteristics with the same corresponding relation as shown in FIGS. 2 and 7, the operation of the present embodiment is similar to that of the above embodiments.

Figure 7:
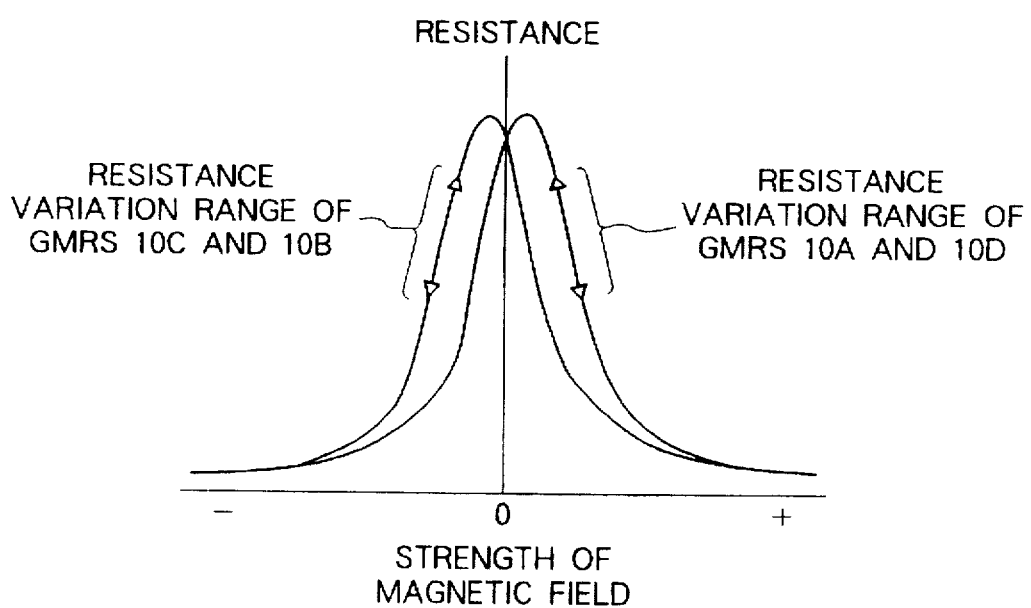
FIG. 7 is a characteristic diagram illustrating the change of resistance of the GMR device versus length of a magnetic field in the third embodiment of the sensing device according to the present invention.

As a result of the manner in which the GMR devices 10A and 10D disposed on one side of the Wheatstone bridge circuit encounter a magnetic field having a polarity opposite to that applied to the GMR devices 10C and 10B disposed on the other side of the Wheatstone bridge circuit, the GMR devices 10A, 10B, 10C, and 10D of the Wheatstone bridge circuit change in resistance as shown in FIG. 7. That is, the GMR devices 10A and 10D of the bridge circuit exhibit resistance change symmetrical to that of the GMR devices 10C and 10B. As a result, the output $V_{DO}$ of the differential amplifier 12 connected to the bridge circuit has a waveform such as that shown in FIG. 3, which is similar to that obtained in the embodiment 1 or 2 described above. As can be seen from FIG. 3, the output changes at each edge of the protruding and recessed portions of the rotating member 2 of magnetic material wherein there is no longer difference in the output level between the protruding portions and the recessed portions, and thus the hysteresis of the GMR device no longer has influence on the output of the differential amplifier 12.

The output signal of the differential amplifier 12 is compared with the reference values or the comparison levels $V_{T1}$, $V_{T2}$ via the comparison circuit 13 thereby generating a precise signal which always corresponds to the protruding and recessed portions of the rotating member 2 of magnetic material.

In the present embodiment, as described above, although the GMR devices of the Wheatstone bridge circuit have hysteresis in resistance characteristics versus applied magnetic field, the difference in the output level between the protruding portions and recessed portions of the rotating member of magnetic material is eliminated by applying a magnetic field to the respective GMR devices such that two GMR devices encounter a magnetic field with a polarity opposite to the polarity of the magnetic field applied to the remaining two GMR devices thereby achieving symmetry in the resistance variation range between the two GMR devices on one side of the bridge circuit and the other two GMR devices on the other side of the bridge circuit. As a result, the output changes at each edge of the protruding and recessed portions of the rotating member of magnetic material; there is no longer difference in the output level between the protruding portions and the recessed portions; the hysteresis of the GMR devices no longer has influence on the output of the differential amplifier; and thus the output signal precisely corresponds to the protruding and recessed portions of the rotating member of magnetic material.

Furthermore, since the detected output signal has a greater signal level, the detection accuracy is further improved, and the detection is not easily disturbed by external noise, that is, the signal-to-noise ratio is improved.

Although the Wheatstone bridge circuit constructed with GMR devices is employed in this specific embodiment, other similar circuit configurations may also be employed.

Furthermore, the manner in which magnetic fields are applied to the respective GMR devices is not limited to that employed in the present embodiment. Magnetic fields may be applied to the GMR devices in a different manner as long as different GMR devices encounter a magnetic field having different polarities.

Embodiment 4

Figure 8:
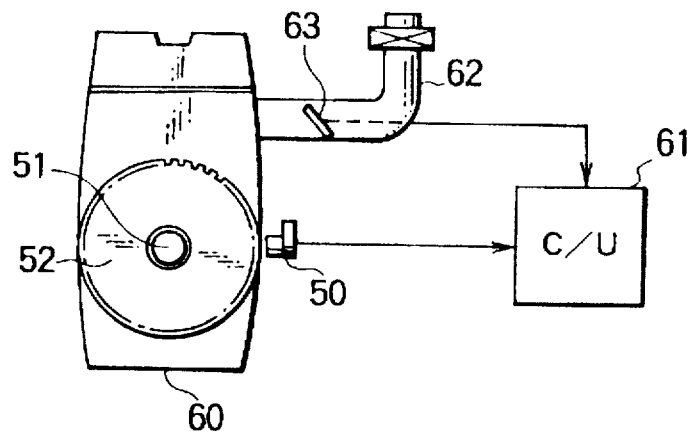
FIG. 8 is a sectional side view illustrating a fourth embodiment of a sensing device according to the present invention.
Figure 9:
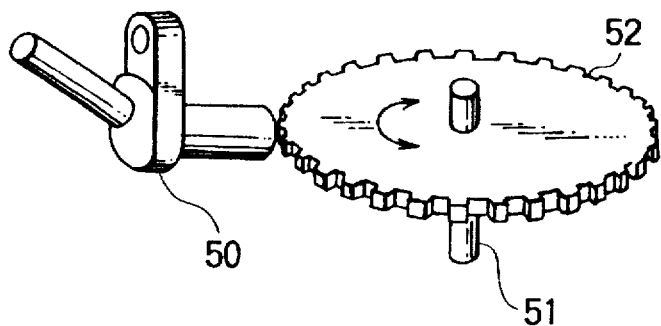
FIG. 9 is a perspective view illustrating the relative positions of the main part of the sensing device and a rotary member of magnetic material in the fourth embodiment according to the present invention.
Figure 10:
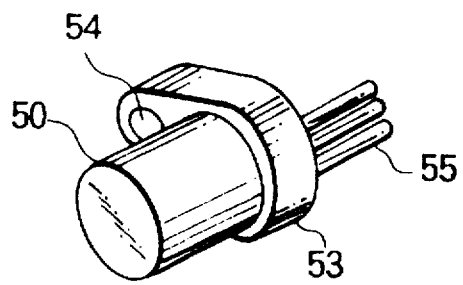
FIG. 10 is a perspective view illustrating the main part of the sensing device of the fourth embodiment according to the present invention.
Figure 11:
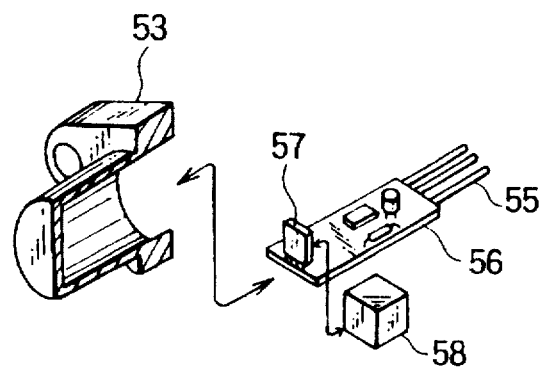
FIG. 11 is an exploded view illustrating the internal structure of the main part of the sensing device of the fourth embodiment according to the present invention.

FIGS. 8 to 11 illustrate fourth embodiment of the invention, in which the invention is applied to an internal combustion engine. FIG. 8 is a schematic diagram illustrating the construction of the entire system of the embodiment. FIG. 9 is a perspective view illustrating the relative positions of the main part of a sensing device and a rotary member of magnetic material. FIG. 10 is a perspective view illustrating the main part of the sensing device, and FIG. 11 illustrates the internal structure thereof. As shown in these figures, the main part of the sensing device 50 is disposed at a location adjacent to the internal combustion engine 60. A rotary member of magnetic material 52 serving as a signal plate is disposed on a crank shaft or a cam shaft of the engine 60 serving as a rotation shaft 51 so that the rotary member of magnetic material 52 can rotate in synchronization with the rotation shaft 51 wherein the rotary member of magnetic material 52 has at least one protruding or recessed portion as in the above-described rotary member of magnetic material 2.

A control unit 61 is connected to a circuit unit of the main part of the sensing device 50. The control unit 61 is also connected to a throttle valve disposed in the intake manifold 62 of the internal combustion engine 60.

The main part of the sensing device 50 is disposed near the internal combustion engine 60 in such a manner that the magnetic field sensing plane of the giant magnetoresistance devices of the main part of the sensing device 50 faces the rotary member of magnetic material 52.

As shown in FIG. 10, the main part of the sensing device 50 includes: a housing 53 made up of resin or a non-magnetic material; an attachment part 54; and input/output lead terminals 55 such as a power supply terminal, a ground terminal, and an output terminal, extending from the bottom portion of the housing 53.

As shown in FIG. 11, inside the housing 53 is a substrate 56 on which a circuit such as that described earlier with reference to FIG. 26 is disposed. On the substrate 56, there is also provided giant magnetoresistance devices 57 and a magnet 58 similar to for example the above-described giant magnetoresistance device 10 and magnet 4, respectively, in such a manner that the center of the magnetic field sensing plane of the giant magnetoresistance devices 57 is shifted from the center of the magnet 58.

The operation will be described below.

When the internal combustion engine 60 is started and the rotary member of magnetic material 52 thus starts to rotate in synchronization with the rotation of the rotating shaft 51, the magnetic field applied to the magnetic field sensing plane of the giant magnetoresistance devices 57 of the main part of the sensing device 50 changes in response to the protruding and recessed portions, and a corresponding change occurs in the resistance of the giant magnetoresistance devices 57. As a result the voltage difference between the mid-point voltages of a Wheatstone bridge circuit including the giant magnetoresistance devices 57 changes correspondingly. The voltage difference is amplified by a differential amplifier, and the output signal of the differential amplifier is supplied to a comparator which in turn compares the output signal of the differential amplifier with a reference voltage and outputs a "0" or "1" signal in response to the comparison result. The output signal of the comparator is then shaped by a waveform shaping circuit. The resultant signal having a "0" or "1" level is supplied to the control unit 61. From this signal, the control unit 61 can acquire the information about the rotation angle and the rotation speed of the crank shaft and the cam shaft in relation to each cylinder of the internal combustion engine 60.

On the basis of the output signal of the sensing device, which has either a "0" or a "1" level, and also on the basis of the information about the opening ratio of the throttle valve 63, the control unit 61 generates control signals by which the ignition timing of ignition plugs (not shown) and the injection timing of the fuel injection valves are controlled.

Figure 12:
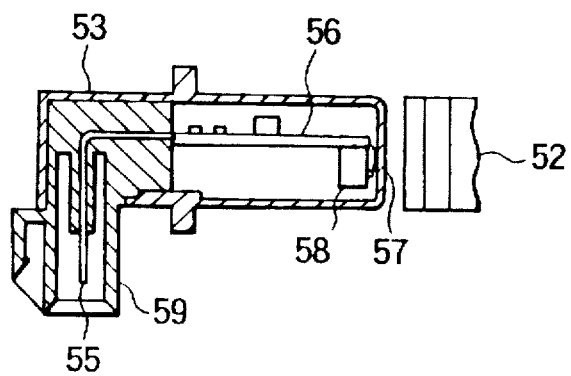
FIG. 12 is a sectional side view illustrating a modified example of the main part of the sensing device based on the fourth embodiment of the invention.

Although, in the specific example described above, the main part of the sensing device 50 has input/output terminals 55 in the form of leads, a connector 59 such as that shown in FIG. 12 which can be attached in a removable fashion to the housing 53 may also be employed.

In this case, the terminals 55 are incorporated in the connector 59 so that when the connector 59 is fitted into the housing 53 the terminals 55 come in contact with the circuit disposed on the substrate 56. This connector 59 makes it easy to handle the sensing device with a simple mechanism, and also makes it easy to mount the sensing device on an internal combustion engine.

As described above, the present embodiment provides a small-sized and high-precision sensing device which can imprecisely detect the rotation angle (rotation speed) of the crank shaft or the cam shaft of an internal combustion engine. This makes it possible to precisely control the internal combustion engine. Furthermore, the sensing device of the present embodiment can be easily mounted in a highly reliable fashion on an internal combustion engine without requiring a large mounting space.

Furthermore, as soon as the electric power is turned on, the sensing device can start providing a reliable output signal precisely corresponding to the protruding and recessed portions of the rotary member of magnetic material. This makes it possible to detect the crank angle of the internal combustion engine without delay time, and thus makes it also possible to precisely control the ignition timing and the fuel injection timing without delay time. This technique therefore makes it possible to achieve an internal combustion engine which satisfies the requirements prescribed by exhaust gas regulation s.

Still furthermore, by means of utilizing edges corresponding to the protruding and recessed portions of the rotary member of magnetic material, the edges can be made to correspond to top dead center of an internal combustion engine, thus making it possible to improve angle accuracy.

Embodiment 5

Figure 13:
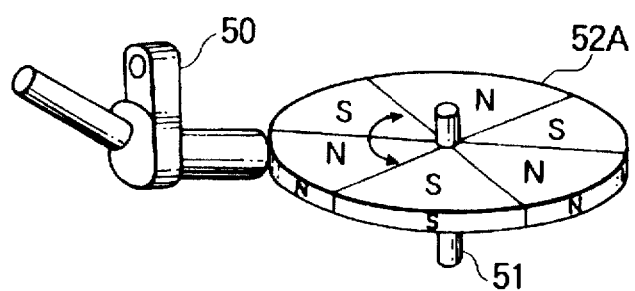
FIG. 13 is a schematic diagram illustrating an fifth embodiment of a sensing device according to the present invention.

FIGS. 13 and 14 illustrate a fifth embodiment of the present invention in which the invention is also applied to an internal combustion engine. FIG. 13 is a perspective view illustrating the relative positions of the main part of a sensing device and a rotary member of magnetic material. FIG. 14 illustrates the internal structure of the sensing device.

In FIGS. 13 and 14, elements and parts similar to those in FIGS. 9 or 11 are denoted by similar reference numerals and will not be described here in further detail. The construction of the entire system and the construction of the main part of the sensing device are similar to those shown in FIGS. 8 and 10, respectively.

A rotary member of magnetic material 52A serving as a signal plate is disposed on a crank shaft or a cam shaft of the engine 60 serving as a rotation shaft 51 so that the rotary member of magnetic material 52A can rotate in synchronization with the rotation shaft 51 wherein the rotary member of magnetic material 52A has similar structure to that of the rotary member of magnetic material 42 described above. As in the rotary member of magnetic material 42, the rotary member of magnetic material 52A also consists of magnets which have been produced by means of magnetization so that the rotary member of magnetic material 52A has the desired magnetic poles.

The main part of the sensing device 50 is disposed near the internal combustion engine 60 (refer to FIG.8) in such a manner that the magnetic field sensing plane of the giant magnetoresistance devices of the main part of the sensing device 50 faces the rotary member of magnetic material 52A.

The main part of the sensing device 50 includes: a housing 53 made up of resin or a non-magnetic material; an attachment part 54 (refer to FIG. 10); and input/output lead terminals 55 such as a power supply terminal, a ground terminal, and an output terminal, extending from the bottom portion of the housing 53.

Inside the housing 53 is a substrate 56 on which a circuit such as that described earlier with reference to FIG. 26 is disposed. On the substrate 56, there are also provided giant magnetoresistance devices 57 similar to the above-described giant magnetoresistance devices 10.

The operation will be described below for example.

If the internal combustion engine 60 is started and thus the rotary member of magnetic material 52A starts to rotate in synchronization with the rotation of the rotating shaft 51, the magnetic field applied to the magnetic field sensing plane of the giant magnetoresistance devices 57 of the main part of the sensing device 50 changes in response to the protruding and recessed portions, and a corresponding change occurs in the resistance of the giant magnetoresistance device 57. As a result the voltage difference between the mid-point voltages of a Wheatstone bridge circuit including the giant magnetoresistance devices 57 changes correspondingly. The voltage difference is amplified by a differential amplifier, and the output signal of the differential amplifier is supplied to a comparator which in turn compares the output signal of the differential amplifier with a reference voltage and outputs a "0" or "1" signal in response to the comparison result. The output signal of the comparator is then shaped by a waveform shaping circuit. The resultant signal having a "0" or "1" level is supplied to the control unit 61 (refer to FIG. 8).

From this signal, the control unit 61 can acquire the information about the rotation angle and the rotation speed of the crank shaft and the cam shaft of each cylinder of the internal combustion engine 60.

On the basis of the output signal of the sensing device, which has either a "0" or a "1" level, and also on the basis of the information about the opening ratio of the throttle valve 63, the control unit 61 generates control signals by which the ignition timing of ignition plugs (not shown) and the injection timing of the fuel injection valves are controlled.

15

Although, in the specific example described above, the main part of the sensing device 50 has input/output terminals 55 in the form of leads, a connector 59 such as that shown in FIG. 15 which can be attached in a removable fashion to the housing 53 may also be employed. In this case, the terminals 55 are incorporated in the connector 59 so that when the connector 59 is fitted into the housing 53 the terminals 55 come in contact with the circuit disposed on the substrate 56. This connector 59 makes it easy to handle the sensing device with a simple mechanism, and also makes it easy to mount the sensing device on an internal combustion engine.

As described above, the present embodiment also can provide a small-sized and high-precision sensing device at a low cost, which can precisely detect the rotation angle (rotation speed) of the crank shaft or the cam shaft of an internal combustion engine. This makes it possible to precisely control the internal combustion engine. Furthermore, the sensing device of the present embodiment can be easily mounted in a highly reliable fashion on an internal combustion engine without requiring a large mounting space.

Still furthermore, as soon as the electric power is turned on, the sensing device can start providing a reliable output signal precisely corresponding to the magnetic poles of the magnets of the rotary member of magnetic material. This makes it possible to detect the crank angle of the internal combustion engine without a delay time, and thus makes it possible to precisely control the ignition timing and the fuel injection timing without delay time. This technique therefore makes it possible to achieve an internal combustion engine which satisfies the requirements prescribed by exhaust gas regulation s.

Embodiment 6

FIG. 16 illustrate a sixth embodiment of the present invention, wherein FIG. 16a is a perspective view illustrating the relative positions of the main part of a sensing device and a rotary member of magnetic material, and FIG. 16b, is a side view thereof. In FIG. 16, similar elements and parts to those in FIG. 9 are denoted by similar reference numerals, and they are not described here in further detail.

In all the previous embodiments, the main part of the sensing device is disposed in a position perpendicular to the rotating axis. In contrast, in this tenth embodiment, the main part of the sensing device is disposed in a position parallel to the rotating axis.

That is, as shown in FIG. 16, the main part of the sensing device 50 is shifted in a direction along the rotating axis 51 so that the magnetic field sensing plane of the giant magnetoresistance device of the main part of the sensing device 50 faces the protruding and recessed portions 52a of the rotary member of magnetic material 52.

The present embodiment provides not only similar effects to those in the fourth embodiment described above, but also an additional advantage that the space near the rotating shaft can be effectively utilized in disposing the main part of the sensing device. In this arrangement, no additional space in a radial direction is required to install the main part of the sensing device, and therefore it is possible to further reduce the size of the sensing device.

Embodiment 7

FIG. 17 illustrates a seventh embodiment of the invention. FIG. 16a is a perspective view illustrating the relative positions of the main part of a sensing device and a rotary member of magnetic material, and FIG. 17b, is a side view thereof. In FIG. 17, elements and parts similar to those in FIG. 13 are denoted by similar reference numerals, and they are not described here in further detail.

In this embodiment, as in the sixth embodiment described above, the main part of the sensing device is disposed in a position parallel to the rotating axis.

That is, as shown in FIG. 17, the main part of the sensing device 50 is disposed in a position parallel to the rotating axis 51 so that the magnetic field sensing plane of the giant magnetoresistance device of the main part of the sensing device 50 faces the magnetic poles of the rotary member of magnetic material 52A.

The present embodiment not only provides effects similar to those in the fourth embodiment described above, but also provides an additional advantage that the space near the rotating shaft can be effectively utilized in disposing the main part of the sensing device. In this arrangement, thus, no additional space in a radial direction is required to install the main part of the sensing device, and therefore it is possible to further reduce the size of the sensing device. As a matter of course, the rotary member of magnetic material 52A may be replaced by the rotary member of magnetic material 41 provided with the magnet 40.

Embodiment 8

FIGS. 18 and 19 illustrate an eighth embodiment of the invention, wherein FIG. 18 is a schematic diagram illustrating the main part of a sensing device and FIG. 19 is a side view thereof.

In these figures, elements and parts similar to those in FIG. 9 or 11 are denoted by similar reference numerals and will not be described here in further detail.

In all previous embodiments, the giant magnetoresistance of the main part of the sensing device is disposed at a predetermined distance apart from the rotary member of magnetic material. In contrast, in this twelfth embodiment, the rotary member of magnetic material is disposed between a magnet and the giant magnetoresistance device of the main part of the sensing device in such a manner that the rotary member of magnetic material is spaced a predetermined distance apart from the magnet and the giant magnetoresistance device.

The main part of the sensing device 50A includes: a housing 70 made up of for example a resin or a non-magnetic material; a cover 71 for protecting a giant magnetoresistance device 57 similar to the above-described giant magnetoresistance device 10, the giant magnetoresistance device 57 being disposed in a cavity 70a inside the housing 70; and an attachment part 74. In the cavity 70a inside the housing 70, there is provided a substrate (not shown) on which a circuit similar to that described above with reference to FIG. 26 is mounted. The giant magnetoresistance device 57 is mounted on the substrate described above. The giant magnetoresistance device 57 is electrically connected to terminals 72 extending to its bottom portion via the inside of the main part of the sensing device 50A. The other ends of the terminals 72 are connected to input/output lead terminals 73 including a power supply terminal, a ground terminal, and an output terminal, which extend toward the outside for the connection to an external circuit.

A magnet 58 is disposed on the bottom of the space 70b, on a side of the housing 70 so that the magnet 58 faces the magnetic field sensing plane of the giant magnetoresistance device 57 disposed in the cavity 70a. The rotary member of magnetic material 52 which is adapted to rotate in synchronization with the rotating shaft 51 is disposed in such a manner that at least its protruding and recessed portions pass through the gap between the giant magnetoresistance device 57 and the magnet 58.

In this arrangement, a magnetic path is formed through the magnet 58, the rotary member of magnetic material 52, and the giant magnetoresistance device 57. When a recessed portion of the rotary member of magnetic material 52 is located between the giant magnetoresistance device 57 and the magnet 58, the magnetic field emerging from the magnet 58 is applied directly to the magnetic field sensing plane of the giant magnetoresistance device 57. On the other hand, when a protruding portion of the rotary member of magnetic material 52 is located between the giant magnetoresistance device 57 and the magnet 58, the magnetic field emerging from the magnet 58 is absorbed into the rotary member of magnetic material 52, and, as a result, substantially no magnetic field is applied to the magnetic field sensing plane of the giant magnetoresistance device 57.

Therefore the above structure has, in effect, the same function as the rotary member of magnetic material 52 at least a part of which is formed with a magnet. As a result, it is also possible in this structure to start a detecting operation as soon as the electric power is turned on.

In the specific example described above, the magnet 58 is disposed on the bottom of the space 70b on the side of the housing 70 so that the magnet 58 faces the magnetic field sensing plane of the giant magnetoresistance device 57 disposed in the cavity 70a. However, a core 75 may be further provided between the bottom of the space 70b and the magnet 58 as shown in FIG. 20 thereby forming a magnetic circuit. In this case, a closed magnetic path starting from the magnet 58 and passing through the rotary member of magnetic material 52, the giant magnetoresistance device 57, the rotary member of magnetic material 52, the core 75, and finally ending at the magnet 58 is established. This magnetic circuit leads to an improvement in the reliability of the sensing operation.

Thus, the present embodiment not only provides effects similar to those in the fourth embodiment described above, but also provides an additional advantage that it is possible to start a sensing operation as soon as the electric power is turned on even though the rotary member of magnetic material is properly positioned between the giant magnetoresistance device and the magnet.

Embodiment 9

FIG. 21 is a sectional side view illustrating a nineth embodiment of the invention.

In FIG. 21, elements and parts similar to those in FIG. 13 or 18 are denoted by similar reference numerals, and they are not described here in further detail.

In the eighth embodiment described above, the rotary member of magnetic material is of a common type having protruding and recessed portions such as that shown in FIG. 9. A rotary member composed of magnets (FIG. 13) or a rotary member on which a magnet is mounted (not shown) may also be employed as the rotary member of magnetic material. In this specific embodiment, the rotary member of magnetic material is composed of magnets. In this case, therefore, the magnet 58 employed in the embodiment described above in connection with FIG. 18 is no longer required. The other parts are similar to those of FIG. 18.

In this embodiment, the rotary member of magnetic material 52A is disposed so that at least the peripheral portion of the rotary member of magnetic material 52A passes though the space 70b formed on the side of the housing 70 of the main part of the sensing device 50B and so that the rotary member of magnetic material 52A faces the magnetic field sensing plane of the giant magnetoresistance device 57 disposed in the cavity 70a.

As can be seen from the above description, a magnetic path passing though the rotary member of magnetic material 52A and the giant magnetoresistance device 57 is also established in the present embodiment, which leads to an improvement in sensing performance. As a matter of course, it also becomes possible to start a sensing operation as soon as the electric power is turned on.

Thus, the present embodiment not only provides effects similar to those in the fifth embodiment described above, but also provides an additional advantage that the reliability and the performance of the sensing operation are improved.

Embodiment 10

In all the previous embodiments, the moving member of magnetic material serving as the magnetic field variation inducing means is adapted to rotate in synchronization with the rotating shaft. However, the moving member of magnetic material may also be adapted to move along a straight line. Such a moving member can find application for example in the detection of the degree of opening of an EGR valve in an internal combustion engine.

What is claimed is:

1. A sensing device comprising:

magnetic field generation means for generating a magnetic field;

magnetic field variation inducing means for changing the magnetic field generated by said magnetic field generation means, said magnetic field variation inducing means being disposed a predetermined distance apart from said magnetic field generation means;

a giant magnetoresistance device for detecting said varying magnetic field, said giant magnetoresistance device exhibiting hysteresis in terms of resistance versus allied magnetic field and having an operating range which is set so that the change in resistance of said giant magnetoresistance device is uniform over the entire operating range in both directions of change in the magnetic field induced by said magnetic field variation inducing means, wherein said giant magnetoresistance device is disposed in such a manner that the center of the magnetic field sensing plane of said giant magnetoresistance device deviates by a predetermined distance from the center of said magnetic field generation means in a direction parallel to a plane containing the displacement direction of said magnetic field variation inducing means so that the center of the magnetic field generation means is located a position corresponding to a peak in the characteristic curve of the giant magnetoresistance device in terms of resistance versus magnetic field thereby eliminating effects of the hystersis.

2. A sensing device according to claim 1, wherein a bridge circuit is constructed using said giant magnetoresistance devices so that the magnetic field applied to the giant magnetoresistance device disposed at one branch of said bridge circuit is opposite in polarity to that applied to the giant magnetoresistance device disposed at another branch of said bridge circuit.

3. A sensing device according to claim 1, wherein said magnetic field variation inducing means is composed of a moving member of magnetic material provided with at least one protruding or recessed portion.

4. A sensing device according to claim 2, wherein said magnetic field variation inducing means is composed of a moving member of magnetic material provided with at least one protruding or recessed portion.

5. A sensing device according to claim 1, wherein said magnetic field generation means and said magnetic field variation inducing means are formed into a moving member of magnetic material provided with at least one magnetic pole so that said moving member of magnetic material generates a magnetic field and changes said magnetic field.

6. A sensing device according to claim 2, wherein said magnetic field generation means and said magnetic field variation inducing means are formed into a moving member of magnetic material provided with at least one magnetic pole so that said moving member of magnetic material generates a magnetic field and changes said magnetic field.

7. A sensing device according to claim 3, wherein said moving member of magnetic material is a rotary member which rotates in synchronization with a rotating shaft.

8. A sensing device according to claim 5, wherein said moving member of magnetic material is a rotary member which rotates in synchronization with a rotating shaft.

9. A sensing device according to claim 7, including a main part of the sensing device provided with said giant magnetoresistance device, said rotary member being mounted on a crank shaft or a cam shaft in an internal combustion engine, said main part of the sensing device being disposed adjacent to said internal combustion engine so that said rotary member faces said giant magnetoresistance device.

10. A sensing device according to claim 8, including a main part of the sensing device provided with said giant magnetoresistance device, said rotary member being mounted on a crank shaft or a cam shaft in an internal combustion engine, said main part of the sensing device being disposed adjacent to said internal combustion engine so that said rotary member faces said giant magnetoresistance device.

11. A sensing device according to claim 9, wherein said main part of the sensing device is disposed at a location away from said rotary member in a direction along the rotation axis of the rotating shaft.

12. A sensing device according to claim 10, wherein said main part of the sensing device is disposed at a location away from said rotary member in a direction along the rotation axis of the rotating shaft.

13. A sensing device according to claim 11, wherein said main part of the sensing device includes a housing in which said giant magnetoresistance device is disposed, and said rotary member is disposed in a space on a side of said housing in such a manner that at least the periphery of said rotary member faces said giant magnetoresistance device.

14. A sensing device according to claim 12, wherein said main part of the sensing device includes a housing in which said giant magnetoresistance device is disposed, and said rotary member is disposed in a space on a side of said housing in such a manner that at least the periphery of said rotary member faces said giant magnetoresistance device.

* * * * *